United States Patent Office 3,272,032
Patented Sept. 13, 1966

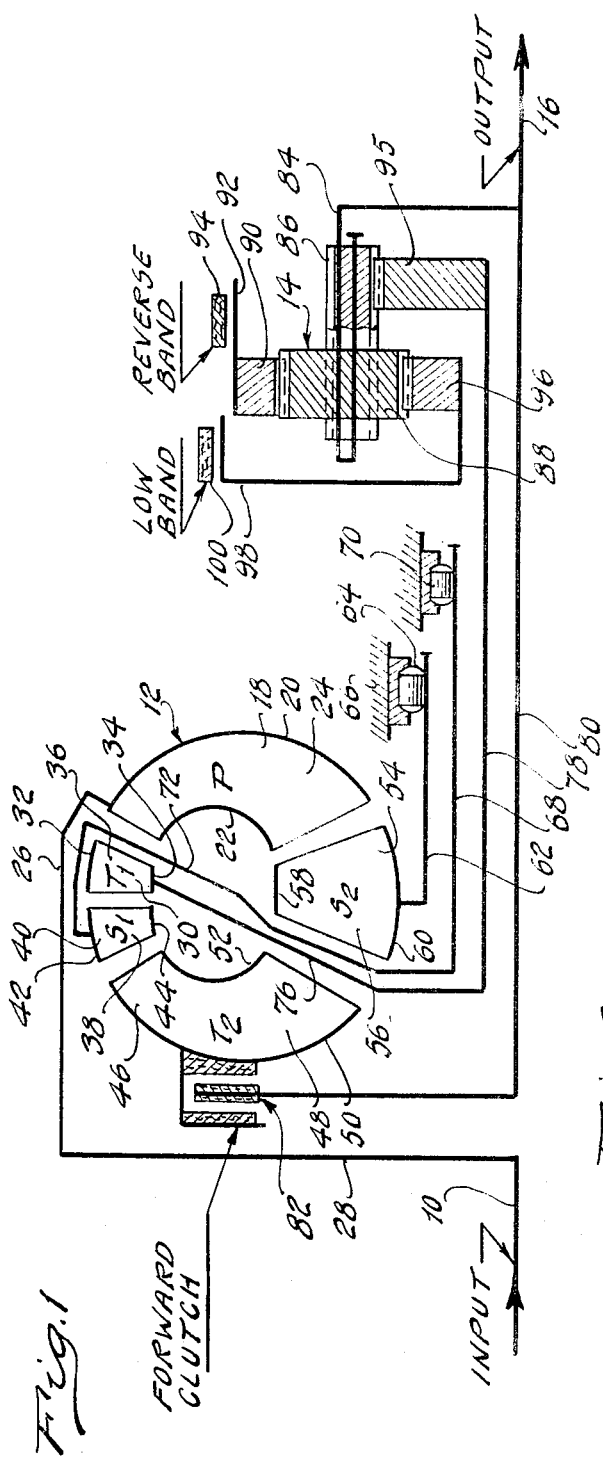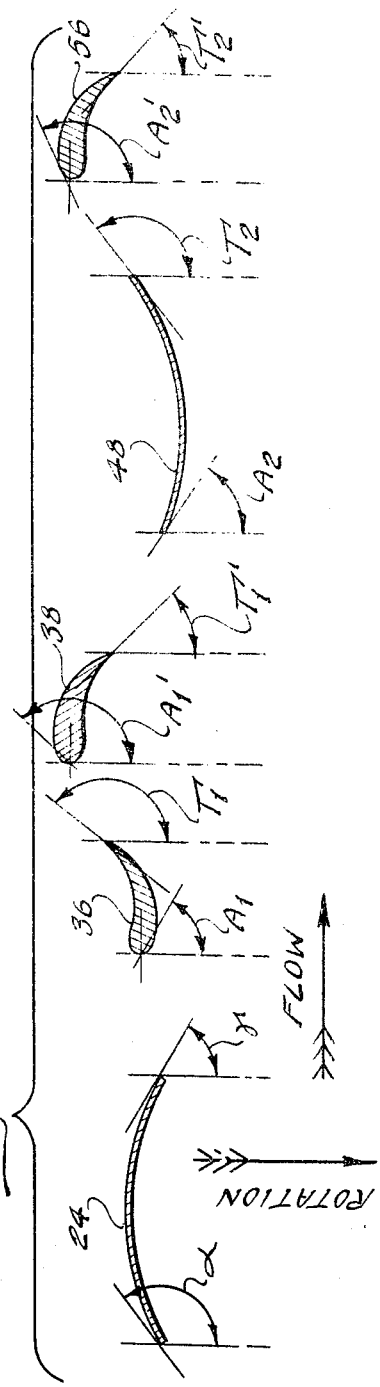

3,272,032
HYDROKINETIC POWER TRANSMISSION MECHANISM INCLUDING MULTIPLE ELEMENT TORQUE CONVERTER
Steven Smalinskas, Detroit, Mich., assignor to Ford Motor Company, Dearborn, Mich., a corporation of Delaware
Filed Mar. 5, 1964, Ser. No. 349,679
4 Claims. (Cl. 74—677)

My invention relates generally to hydrokinetic power transmission mechanisms, and more particularly to an improved hydrokinetic power transmission with a torque converter having plural stators and turbines situated in a common torus circuit and a planetary gear system for augmenting the effective performance range of the converter.

The provision of a power transmission mechanism of the type above set forth being a principal object of my invention, it is a further object of my invention to provide a power transmission mechanism having a hydrokinetic torque converter with multiple turbines wherein provision is made for augmenting the effective torque of one of said turbines by means of a planetary gear system during operation in a low speed ratio drive range. I contemplate that a second turbine may be coupled to driven portions of the mechanism during operation in a high speed ratio drive range.

It is a further object of my invention to provide a power transmission mechanism of the type set forth in the preceding objects wherein the gear system may be rendered ineffective to transfer driving torque from the first turbine to the driven portions of the mechanism during operation in the high speed ratio range.

It is another object of my invention to provide a forward drive clutch means for connecting selectively a second turbine to driven portions of the mechanism and for interrupting this connection during reverse drive operation when the mechanism is conditioned for neutral.

Further objects and features of my invention will become apparent from the following description and from the accompanying drawings, wherein:

FIGURE 1 shows in schematic cross-sectional form an assembly view of a power transmission mechanism embodying the features of my invention; and FIGURE 2 shows a blade cascade diagram of the blading as it would appear if individual blades of the elements of the torque converter of FIGURE 1 were to be unwrapped from the torus of FIGURE 1 into the plane of FIGURE 2.

Referring first to FIGURE 1, numeral 10 designates a driving shaft which may correspond to the crankshaft of an internal combustion vehicle engine in an automotive vehicle driveline. A hydrokinetic torque converter is shown at 12 and a planetary gear system is shown at 14. The converter 12 and the gear system 14 form plural torque delivery paths between the shaft 10 and the driven shaft 16 which may be connected to the vehicle traction wheels through a suitable drive shaft and differential assembly.

The torque converter 12 includes a bladed impeller 18 having an outer shroud 20, an inner shroud 22 and radial outflow impeller blades 24 situated between the shrouds 20 and 22.

Shoud 20 is connected to an impeller drive shell 26 which in turn is connected to shaft 10 through a suitable drive plate 28.

A first turbine 30 is situated at the flow exit region of the impeller 18. It includes an outer shroud 32, an inner shroud 34, and turbine blades 36.

Blades 36 form continuations of the fluid flow passages of the impeller blades 24 and they are formed with a geometry that will cause a direction change in the tangential component of the absolute fluid flow velocity vector of the fluid leaving the flow exit region of the blades 24 thereby creating a driving turbine torque.

As the fluid leaves the exit section of the blades 36, it enters the flow entrance section of the blades 38 of a primary stator 40. This stator includes an outer shroud 42 and an inner shroud 44, the blades 38 being situated between the shrouds.

Disposed at the flow exit region of the primary stator 40, is a secondary turbine 46. It includes turbine blades 48, an outer shroud 50, and an inner shroud 52, the blades 48 being situated between the shrouds to define the radial inflow passages.

Located between the flow exit section of the turbine blade 48 and the flow entrance section of the impeller blades 24 is a secondary stator 54 that comprises stator blades 56, an inner shroud 58 and an outer shroud 60. The outer shroud 60 is defined by a stator hub that is secured to a stator sleeve shaft 62. An overrunning brake, which may be in the form of a roller coupling 64, is used for the purpose of inhibiting rotation of the stator 54 in the direction of rotation opposite that of the impeller 18 although freewheeling motion thereof in the same direction may be accommodated. The roller coupling 64 transmits torque reaction through a stationary portion of the transmission housing shown in part at 66.

The geometry of the stator 40 is such that for any impeller speed the tangential component of the absolute fluid flow velocity vector of the fluid at that point in the torus circuit is increased. This makes it possible for a moment of momentum change to occur as the fluid passes through the blades 48. The resulting turbine torque may be utilized as will be explained subsequently.

A second stator sleeve shaft 68 is disposed concentrically within the shaft 62. An overrunning brake, which may be in the form of a roller coupling 70, is provided for inhibiting rotation of the shaft 68 in the direction of rotation opposite that of the impeller, although freewheeling motion of the shaft 68 in the same direction can be accommodated. Coupling 70 distributes hydrokinetic torque reaction from the shaft 68 to the transmission housing 66.

Outer shroud 42 of the primary stator 40 is connected by means of a web member 72 to the shaft 68. The web member 72 traverses the torus circuit in the region between the impeller exit section and the entrance section of the primary turbine 30, and also in the region between the exit section of the turbine blades 48 and the entrance section of the stator blades 56. The web member 72 can be formed with apertures at the two regions where it traverses the torus circuit to prevent a resistance to the fluid flow.

The inner shroud 34 of the primary turbine 30 is connected to a second web member 74 which extends radially inwardly and transversely the torus circuit in the region between the flow exit section of the blades 48 and the flow entrance section of the blades 56. Like the web member 72, web member 74 can be apertured at the region in which it traverses the torus circuit to prevent resistance to the toroidal fluid flow. Web member 72 is coupled drivably to a turbine sleeve shaft 78 concentrically disposed between stator sleeve shafts 62 and 68.

A central turbine shaft 80 is situated between the turbine sleeve shafts 78. It may be coupled to the secondary turbine 46 by means of a selectively engageable friction clutch structure 82. This clutch can be engaged and released by means of a suitable fluid pressure operated clutch servo to establish and interrupt a mechanical connection between the turbines 46 and the shaft 80. Portions of the clutch structure 82 can be carried by the outer shroud 50 of the turbine 46.

Shaft 80 is connected directly to the power output shaft 16 as indicated. It is connected also to a compound carrier 84 upon which are journalled long planet pinions 86. These pinions engage drivably short planet pinions 88.

A ring gear 90 meshes with planet pinions 88. It is connected to a brake drum 92 about which is positioned a friction brake band 94. This brake band can be applied and released selectively by means of a suitable fluid pressure operated brake servo, thereby anchoring selectively the ring gear 90 and the brake drum 92 to establish reverse drive operation.

Pinions 86, in addition to engaging pinions 88, engage drivably a relatively large diameter sun gear 95 which is connected directly to the sleeve shaft 78. A relatively small diameter sun gear 96 engages planet pinions 88.

A low speed ratio reaction brake drum 98 is connected directly to the sun gear 96. A low speed ratio brake band 100 is positioned about the brake drum 98 and may be applied and released selectively by means of a suitable fluid pressure operated brake servo. This anchors the sun gear 96 to provide a torque reaction element during low speed ratio operation.

In FIGURE 2 I have illustrated in the form of a blade cascade diagram the relative blade geometry of the bladed members of the torque converter 12. The entrance angles for the impeller, the primary stator, the secondary turbine and the secondary stator have been indicated respectively by the symbols $A_1$, $A_1'$, $A_2$, and $A_2'$. The corresponding exit angles for these members have been indicated in FIGURE 2 at $\Gamma_1$, $\Gamma_1'$, $\Gamma_2$ and $\Gamma_2'$ respectively. As the vehicle is accelerated from a standing start, the primary turbine 30 develops a turbine torque that is multiplied by the gear unit 14 and then distributed directly to the traction wheels. The primary turbine is the principal torque delivery member under low speed ratio operating conditions. As the speed ratio increases, the primary stator 40 begins to overrun. The percentage of the driving torque contributed by the secondary turbine increases as the speed ratio increases from zero to a value beyond the speed ratio at which the primary stator 40 begins to freewheel. The primary turbine is substantially ineffective to provide a driving torque contribution during operation in the higher speed ratios.

During forward operation the clutch 82 is engaged continuously. To condition the mechanism for low speed ratio forward drive operation, brake band 100 is applied thereby holding the sun gear 96 stationary. As the vehicle accelerates from a standing start, the primary turbine torque is delivered to the sun gear 94 and with the sun gear 96 acting as a reaction member, the carrier 84 is driven in a forward driving direction at a reduced speed. The torque of the primary turbine 30 thus is multiplied by the ratio of the gearing. The secondary turbine torque is delivered directly to the power output shaft through the engaged clutch 82. The over-all torque ratio thus is equal to the value $$T1\left(1+\frac{S1}{S2}\right)+T2$$

divided by the impeller torque where T1 and T2 equal the torque of the primary turbine and the torque of the secondary turbine, respectively, and where S1 and S2 represent the pitch diameters of sun gears 96 and 94 respectively.

As the torque transmitting capacity of the primary turbine 30 decreases upon an increase in speed ratio, the low speed brake band 100 is released. Thereafter, the entire driving torque is delivered from the secondary turbine 46 through the shaft 80 to the power output shaft 16.

Secondary stator 54 freewheels at a second clutch point as the hydrokinetic torque ratio approaches unity. Thereafter the converter 12 functions as a fluid coupling.

The strategic arrangement of the elements of the converter and the elements of the gear system itself makes possible a relatively high degree of torque ratio carryout and a smooth transition from the high performance-high torque ratio operating range to a high efficiency-high speed ratio operating range. This transition is followed by coupling operation that is characterized by a relatively high degree of efficiency because of the fact that the secondary turbine may be formed with a geometry that will be favorable to high speed ratio operation and coupling performance. This is accomplished without a corresponding decrease in the high torque ratio low speed ratio performance since the primary turbine and the planetary gearing are relied upon principally to supply the torque transmitting capacity that otherwise would be lacking in the secondary turbine if the secondary turbine were called upon to function as the principal torque delivery member throughout the entire speed ratio range.

Reverse drive in my improved arrangement is accomplished by disengaging the forward drive clutch 82 and releasing the brake band 100 while applying brake band 94. The primary turbine 30 thus functions as the only hydrokinetic torque delivery member, and its torque is distributed to the sun gear 94 in the usual fashion. In reverse drive, however, the ring gear 90 acts as a reaction member so the carrier 84 is driven in a reverse direction at a reduced speed relative to the speed of the engine. As in the case of low speed ratio forward drive operation, the primary torque is multiplied by the ratio of the gearing during reverse drive to provide an adequate tractive effort.

Having described a preferred embodiment of my invention, what I claim and desire to secure by U.S. Letters Patent is:

1. A hydrokinetic power transmission comprising a hydrokinetic torque converter and a planetary gear system that cooperate to define the torque delivery paths from a driving member to a driven member, said torque converter comprising an impeller, a primary turbine, a primary stator, a secondary turbine and a secondary stator situated in toroidal fluid flow relationship in a common torus circuit, said gear system comprising a first sun gear, a second sun gear, a ring gear, first planet pinions engageable with said second sun gear, second planet pinions engageable with said first sun gear and also with said ring gear and said first planet pinions, a carrier rotatably supporting said planet pinions, said carrier being connected to said driven member, clutch means for connecting selectively said secondary turbine to said driven member, first overrunning brake means for anchoring said secondary stator against rotation in a forward direction opposite that of said impeller and permitting freewheeling motion thereof in a second direction, second overrunning brake means for inhibiting rotation of said primary stator in a forward direction opposite that of the said impeller but accommodating freewheeling motion thereof in a second direction, a turbine shaft connected to said second sun gear, a first torque transmitting web connecting said turbine shaft to said primary turbine and extending through an inner region of the torus circuit between the exit section of said secondary turbine and the entrance region of said secondary stator, and reaction brake means for anchoring selectively said first sun gear during operation of said mechanism in a low speed ratio range thereby conditioning said gear system to multiply the effective torque developed by said primary turbine.

2. A hydrokinetic power transmission comprising a hydrokinetic torque converter and a planetary gear system that cooperate to define the torque delivery path from a driving member to a driven member, said torque converter comprising an impeller, a primary turbine, a primary stator, a secondary turbine and a secondary stator situated in toroidal fluid flow relationship in a common torus circuit, said gear system comprising a first sun gear, a second sun gear, a ring gear, first planet pinions engageable with said second sun gear, second planet pinions engageable with said first sun gear and also with said ring gear and said first planet pinions, a carrier rotatably supporting said planet pinions, said carrier being connected to said driven member, clutch means for connecting selectively said secondary turbine to said driven member, first overrunning brake means for anchoring said secondary stator against rotation in a forward direction opposite that of said impeller and permitting freewheeling motion thereof in a second direction, second overrunning brake means for inhibiting rotation of said primary stator in a forward direction opposite that of the said impeller but accommodating freewheeling motion thereof in a second direction, a turbine shaft connected to said second sun gear, a first torque transmitting web connecting said turbine shaft to said primary turbine and extending through an inner region of the torus circuit between the exit section of said secondary turbine and the entrance region of said secondary stator, reaction brake means for anchoring selectively said first sun gear during operation of said mechanism in a low speed ratio range thereby conditioning said gear system to multiply the effective torque developed by said primary turbine, and reverse brake means for anchoring selectively said ring gear to condition said mechanism for reverse drive operation when said reaction brake means and said clutch means are disengaged.

3. A hydrokinetic power transmission comprising a hydrokinetic torque converter and a planetary gear system that cooperate to define the torque delivery path from a driving member to a driven member, said torque converter comprising an impeller, a primary turbine, a primary stator, a secondary turbine and a secondary stator situated in toroidal fluid flow relationship in a common torus circuit, said gear system comprising a first sun gear, a second sun gear, a ring, gear, first planet pinions engageable with said second sun gear, second planet pinions engageable with said first sun gear and also with said ring gear and said first planet pinions, a carrier rotatably supporting said planet pinions, said carrier being connected to said driven member, clutch means for connecting selectively said secondary turbine to said driven member, first overrunning brake means for anchoring said secondary stator against rotation in a forward direction opposite that of said impeller and permitting freewheeling motion thereof in a second direction, second overrunning brake means for inhibiting rotation of said primary stator in a forward direction opposite that of the said impeller but accommodating freewheeling motion thereof in a second direction, a turbine shaft connected to said second sun gear, a first torque transmitting web connecting said turbine shaft to said primary turbine and extending through an inner region of the torus circuit between the exit section of said secondary turbine and the entrance region of said secondary stator, reaction brake means for anchoring selectively said first sun gear during operation of said mechanism in a low speed ratio range thereby conditioning said gear system to multiply the effective torque developed by said primary turbine, said second overrunning brake means including a second web member extending through said torus circuit in the region between the exit section of said impeller and the entrance section of said primary turbine and through said first mentioned circuit region and overrunning coupling elements adapted to distribute the reaction torque from said second web member to a stationary portion of said mechanism.

4. A hydrokinetic power transmission comprising a hydrokinetic torque converter and a planetary gear system that cooperate to define the torque delivery path from a driving member to a driven member, said torque converter comprising an impeller, a primary turbine, a primary stator, a secondary turbine and a secondary stator situated in toroidal fluid flow relationship in a common torus circuit, said gear system comprising a first sun gear, a second sun gear, a ring gear, first planet pinions engageable with said second sun gear, second planet pinions engageable with said first sun gear and also with said ring gear and said first planet pinions, a carrier rotatably supporting said planet pinions, said carrier being connected to said driven member, clutch means for connecting selectively said secondary turbine to said driven member, first overrunning brake means for anchoring said secondary stator against rotation in a forward direction opposite that of said impeller and permitting freewheeling motion thereof in a second direction, second overrunning brake means for inhibiting rotation of said primary stator in a forward direction opposite that of the said impeller but accommodating freewheeling motion thereof in a second direction, a turbine shaft connected to said second sun gear, a first torque transmitting web connecting said turbine shaft to said primary turbine and extending through an inner region of the torus circuit between the exit section of said secondary turbine and the entrance region of said secondary stator, reaction brake means for anchoring selectively said first sun gear during operation of said mechanism in a low speed ratio range thereby conditioning said gear system to multiply the effective torque developed by said primary turbine, said second overrunning brake means including a second web member extending through said torus circuit in the region between the exit section of said impeller and the entrance section of said primary turbine and through said first mentioned circuit region and overrunning coupling elements adapted to distribute reaction torque from said second web member to a stationary portion of said mechanism, and reverse brake means for anchoring selectively said ring gear to condition said mechanism for reverse drive operation when said first mentioned brake means and said clutch means are disengaged.

References Cited by the Examiner

UNITED STATES PATENTS

| 2,855,803 | 10/1958 | Knowles | 74—677 |
| 3,086,541 | 4/1963 | De Corte | 74—677 |
| 3,141,355 | 7/1964 | Gabriel | 74—677 |

DAVID J. WILLIAMOWSKY, *Primary Examiner.*

T. C. PERRY, *Assistant Examiner.*